United States Patent [19]
Horvat

[11] Patent Number: 5,980,598
[45] Date of Patent: Nov. 9, 1999

[54] FILTER CLEANING SYSTEM INCLUDING INDIVIDUALLY DRIVEN BELT MOUNTED EXTENDING NOZZLES

[75] Inventor: Ivan J. Horvat, Gastonia, N.C.

[73] Assignee: Carolina Air Filtration, Inc., Gastonia, N.C.

[21] Appl. No.: 09/179,046

[22] Filed: Oct. 26, 1998

Related U.S. Application Data

[63] Continuation-in-part of application No. 08/832,037, Apr. 3, 1997, Pat. No. 5,827,338.

[51] Int. Cl.$^6$ ..................................................... B01D 35/16
[52] U.S. Cl. .................................................. 55/294; 55/302
[58] Field of Search ............................ 55/284, 285, 288, 55/290, 294, 302

[56] References Cited

U.S. PATENT DOCUMENTS

| | | |
|---|---|---|
| 1,941,524 | 1/1934 | Wittemeier et al. . |
| 1,949,002 | 2/1934 | Annis . |
| 2,594,957 | 4/1952 | Martens, Jr. . |
| 2,634,560 | 4/1953 | Ramm . |
| 3,063,874 | 11/1962 | Black, Jr. . |
| 3,147,098 | 9/1964 | Honan et al. . |
| 3,183,647 | 5/1965 | Lang . |
| 3,233,391 | 2/1966 | Olsen . |
| 3,303,635 | 2/1967 | Sherrill ......................... 55/294 |
| 3,306,012 | 2/1967 | Wallin . |
| 3,339,348 | 9/1967 | Bratton et al. . |
| 3,345,805 | 10/1967 | Sherrill . |
| 3,505,792 | 4/1970 | Dahlem . |
| 4,203,738 | 5/1980 | Kerman . |
| 4,509,961 | 4/1985 | Jones ......................... 55/294 |
| 4,725,292 | 2/1988 | Williams . |
| 4,780,151 | 10/1988 | Barzuza . |
| 4,883,506 | 11/1989 | Ribnitz . |
| 4,904,282 | 2/1990 | Stuble et al. . |
| 4,913,085 | 4/1990 | Vohringer et al. . |
| 5,114,444 | 5/1992 | Stuble . |
| 5,143,529 | 9/1992 | Means, Jr. . |
| 5,182,832 | 2/1993 | McMahon . |
| 5,215,562 | 6/1993 | Kaiser . |
| 5,466,271 | 11/1995 | Horvat . |
| 5,651,802 | 7/1997 | Carter et al. . |

FOREIGN PATENT DOCUMENTS

| | | |
|---|---|---|
| 1017890 | 10/1957 | Germany . |
| 1009993 | 11/1965 | United Kingdom . |

*Primary Examiner*—Richard L. Chiesa
*Assistant Examiner*—Minh-Chau T. Pham
*Attorney, Agent, or Firm*—Rhodes, Coats & Bennett L.L.P.

[57] ABSTRACT

A filter cleaning apparatus for removing dust and debris from a stationary filter having a dust and debris collecting surface. The apparatus includes a longitudinally extending duct having a lengthwise slot formed therein. A belt in the duct extends across the slot whereby the duct and the belt together define a plenum. The belt has an opening formed therein adjacent the slot and in fluid communication with the plenum. The belt is mounted for movement along the slot such that the opening may be repositioned along the length of the slot. A nozzle is mounted on the belt for movement therewith and extends outwardly from the belt. The nozzle has an inlet distal from the belt. The inlet has a width substantially transverse to the length of the slot which is greater than a corresponding width of the opening in the belt. The inlet is in fluid communication with the opening and thereby the plenum. The apparatus further includes a belt driver for moving the belt along the slot.

14 Claims, 8 Drawing Sheets

FILTER CLEANING SYSTEM INCLUDING INDIVIDUALLY DRIVEN BELT MOUNTED EXTENDING NOZZLES

RELATED APPLICATIONS

This application is a continuation-in-part of application Ser. No. 08/832,037, filed Apr. 3, 1997, U.S. Pat. No. 5,827,338.

FIELD OF THE INVENTION

The present invention is directed to air conditioning and filtering apparatus, and, more particularly, to an air cleaning apparatus having means for removing collected dust and debris from a stationary filter.

BACKGROUND OF THE INVENTION

Textile manufacturing plants generate large quantities of dust and lint which must be removed from the work environment to ensure worker comfort and safety. Removal is normally achieved by drawing lint and dust containing air from the work area and conveying it through a filtration system where the dust and lint is collected on filters. Normally, the filtration apparatus includes a housing enclosing a plurality of filters and a fan to convey air through the filters. Water spray nozzles may be provided as well. When air passes through the filter surface, lint and dust is deposited on the filter. A particular concern for air filtration systems collecting large particles, such as lint, heavy sawdust and the like, is that larger particles collecting on the filter surface, and in particular, on a pre-filter, tend to clog the surface quickly and thus reduce the filtration efficiency.

One approach to pre-filtering is to provide a roll type filter. A web of filter media initially wound on a first roll is drawn across the filter area. As the filter media web collects dust and debris and the pressure drop across the filter media becomes too great, the filter media web is wound onto a second roll opposite the first roll. Typically, the filter media cannot be reused and is discarded once the initial roll is depleted.

There exists a need for convenient and cost-effective apparatus for pre-filtering air in industrial facilities.

SUMMARY OF THE INVENTION

The present invention is directed to a filter cleaning apparatus for removing dust and debris from a stationary filter having a dust and debris collecting surface. The apparatus comprises a cleaning unit including a longitudinally extending duct having a lengthwise slot formed therein. A belt in the duct extends across the slot whereby the duct and the belt together define a plenum. The belt has an opening formed therein adjacent the slot and in fluid communication with the plenum. The belt is mounted for movement along the slot such that the opening may be repositioned along the length of the slot. A nozzle is mounted on the belt for movement therewith and extends outwardly from the belt. The nozzle has an inlet distal from the belt. The inlet has a width substantially transverse to the length of the slot which is greater than a corresponding width of the opening in the belt. The inlet is in fluid communication with the opening and thereby the plenum. The cleaning unit further includes a belt driver operatively coupled to the belt.

The apparatus may further include a suction source operable to create a vacuum in the plenum and thereby at the inlet of the nozzle, whereby dust and debris disposed on the collecting surface may be drawn through the inlet, the nozzle, and the opening, and into the plenum. Preferably, the belt is an endless belt and the cleaning unit includes a pair of spaced apart rollers, the endless belt being mounted about and extending between the rollers. An exit port may be formed in a side wall of the duct and adapted for fluid communication with a suction source. An adjustable bracket may be provided for adjustably spacing the duct from the filter.

A plurality of the cleaning units may be provided in side-by-side and substantially parallel relation to one another. Each cleaning unit may include at least one roller with the belt mounted on the roller for movement within the slot. Each of the rollers is operatively coupled to a separate belt driver.

The duct may include a pair of opposed flanges formed along the slot. The belt extends between the flanges and has a pair of spaced apart edge portions each disposed within a respective one of the pair of opposed flanges. The flanges form opposing belt receiving cavities within the slot. Preferably, a polymeric seal is mounted in each of the flanges adjacent the edge portion of the belt for forming a substantially airtight seal with the belt.

Preferably, the individual belt drivers are operable to move the belt along the slot in first and second opposed directions so that the nozzle may be reciprocated in the first and second directions. A limit switch may be disposed adjacent the slot, the limit switch operative to reverse the direction of the drive means when actuated. The switch is arranged and configured such that it is actuated when the nozzle is disposed in a prescribed end position with respect to the slot. Any suitable limit switch may be used in the practice of the present invention. Particularly preferred are lever arm and roller plunger type limit switches.

Preferably, the length of the slot extends vertically and the belt extends between an upper roller and a lower roller. An access port is formed in a lower portion of the duct for removing settled dust and debris from the duct. Preferably, a tray is disposed over the lower roller for collecting the settled dust and debris, the access port located substantially adjacent the tray.

In a preferred embodiment, the nozzle is lengthwise adjustable such that the distance between the belt and the inlet may be selectively adjusted. Preferably, the inlet width is at least twice the belt opening width. More preferably, the inlet width is from about 8 to 11 times the belt opening width. The nozzle is preferably T-shaped.

The present invention is further directed to an air cleaning apparatus for removing dust and debris from a volume of air, the air cleaning apparatus incorporating a cleaning unit as described above. The apparatus further includes a stationary filter having a dust and debris collecting surface. The longitudinally extending duct of the cleaning unit is spaced from the collecting surface a prescribed distance and extends lengthwise along the collecting surface. The lengthwise slot faces the collecting surface. The apparatus further includes a suction source operable to create a vacuum in the plenum and thereby at the inlet of the nozzle, whereby dust and debris disposed on the collecting surface is drawn through the inlet, the nozzle, and the opening, and into the plenum.

Preferably, the prescribed distance between the duct and the collecting surface is at least 16 inches.

The apparatus may include a plurality of the aforedescribed cleaning units, each having an exit port in fluid communication with a common suction source.

The present invention is further directed to a filter cleaning apparatus for removing dust and debris from a stationary filter having a dust and debris collecting surface, the apparatus comprising a cleaning unit including a longitudinally extending duct having a lengthwise slot formed therein and a pair of opposed flanges formed along the slot. A belt in the duct extends across the slot, the duct and the belt defining a plenum. The belt extends between the flanges and has a pair of spaced apart edge portions each disposed within a respective one of the pair of opposed flanges. The belt has an opening formed therein adjacent the slot and in fluid communication with the plenum. The belt is mounted for movement within the slot such that the opening may be repositioned along the length of the slot.

The apparatus as just described may further include a polymeric seal mounted in each of the flanges adjacent the edge portions of the belt for forming a substantially airtight seal with the belt.

In an alternative embodiment of the present invention each of the cleaning units may be provided with individual belt drivers so that each nozzle may be operated, i.e., driven upwardly and downwardly along the filter, independently of the other nozzles. The multiple belt drivers may include a separate drive motor coupled to a belt roller via a shaft. In this embodiment, it may be desirable to provide a plurality of pressure drop sensors, one for each filter. Thus, each nozzle would be operated responsive to the pressure differential across the filter with which it is associated. Alternatively, the separate belt drivers could be operated continuously.

The present invention and objects thereof will be appreciated by those of ordinary skill in the art from a reading of the figures and the detailed description of the preferred embodiment which follow, such description being merely illustrative of the present invention.

DETAILED DESCRIPTION OF THE PREFERRED EMBODIMENT

Figure 1:
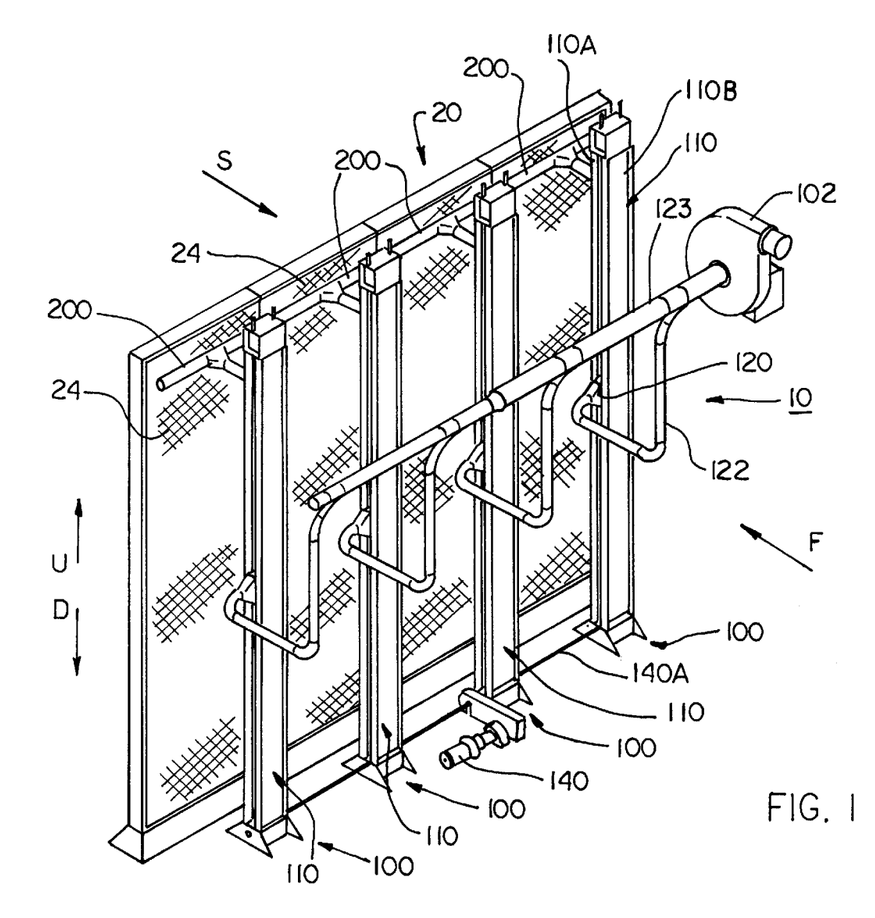
FIG. 1 is a perspective view of an air cleaning system according to the present invention.
Figure 2:
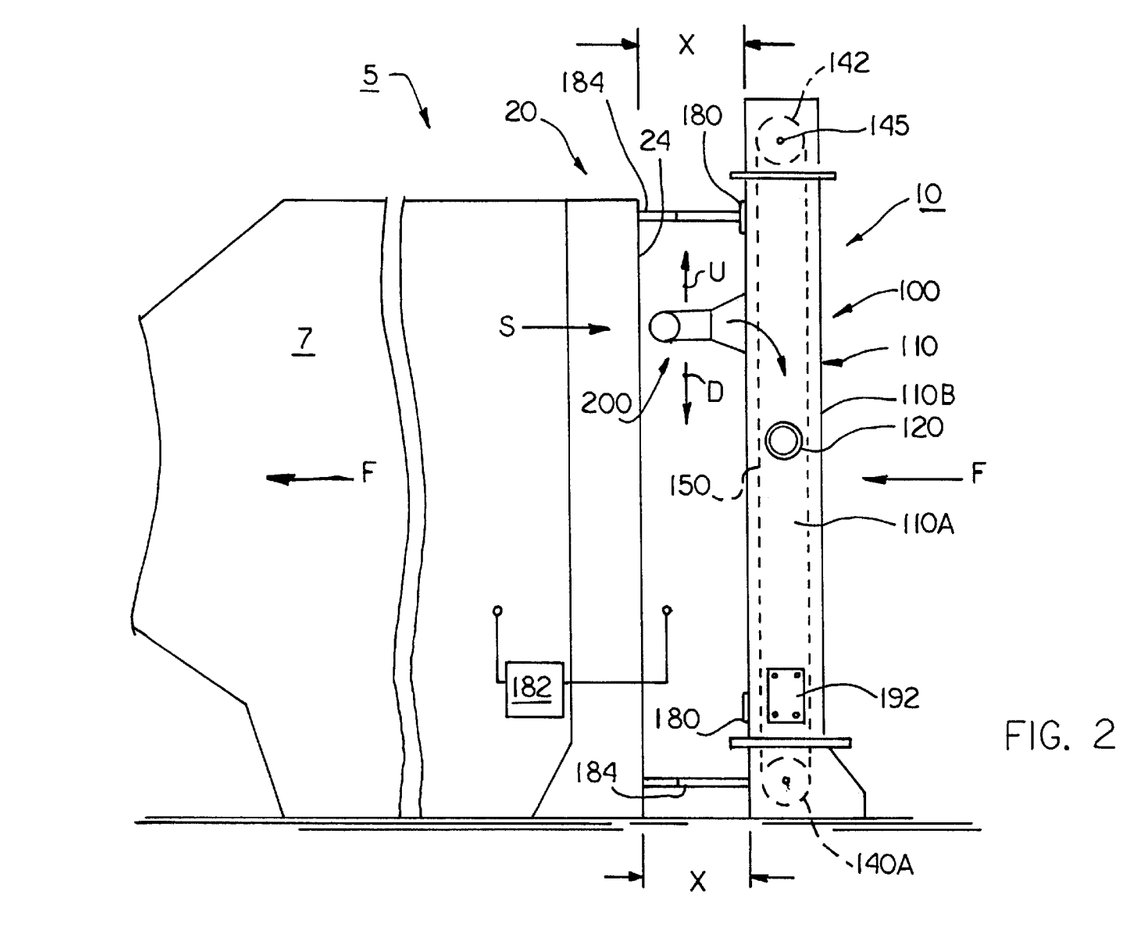
FIG. 2 is a schematic, side elevational, fragmentary view of the air cleaning system with the side walls 22 of the stationary filters removed.

With reference to FIG. 2, an air cleaning system 5 as shown therein includes a conventional air conditioner 7, a bank of cleanable pre-filters 20 and a filter cleaning system 10 according to the present invention. Conventional air conditioner 7 may be any conventional air conditioner system such as, for example, as used for industrial air conditioning. Air conditioner 7 draws dust and debris laden air through pre-filters 20 in direction F. With reference to FIGS. 1 and 2, stationary filter bank 20 includes a series of panels of filter media 24 which form a vertical wall at the inlet of the air conditioner 7. The respective filter media panels 24 are separated by side walls 22 (see FIG. 3; not shown in FIGS. 1 and 2). Suitable filter media include, for example, nonwovens.

Pre-filter cleaning system 10 includes a series of cleaning units 100. Each of the cleaning units 100 are substantially identical. Each cleaning unit 100 includes a vertical duct 110 having a longitudinal slot 116 (see FIG. 5) formed in the side of the duct facing the filters 24, a belt 150 slidably mounted in the slot, and a nozzle 200 mounted on the belt for movement therewith. The nozzles 200 are translated up (direction U) and down (direction D) along the lengths of the respective ducts. As described in more detail below, a vacuum is provided in the plenum defined by the ducts and the belts causing suction at the nozzles which draws debris and dust from the collecting surfaces of the filters 24 in direction S and into the ducts.

Figure 4:
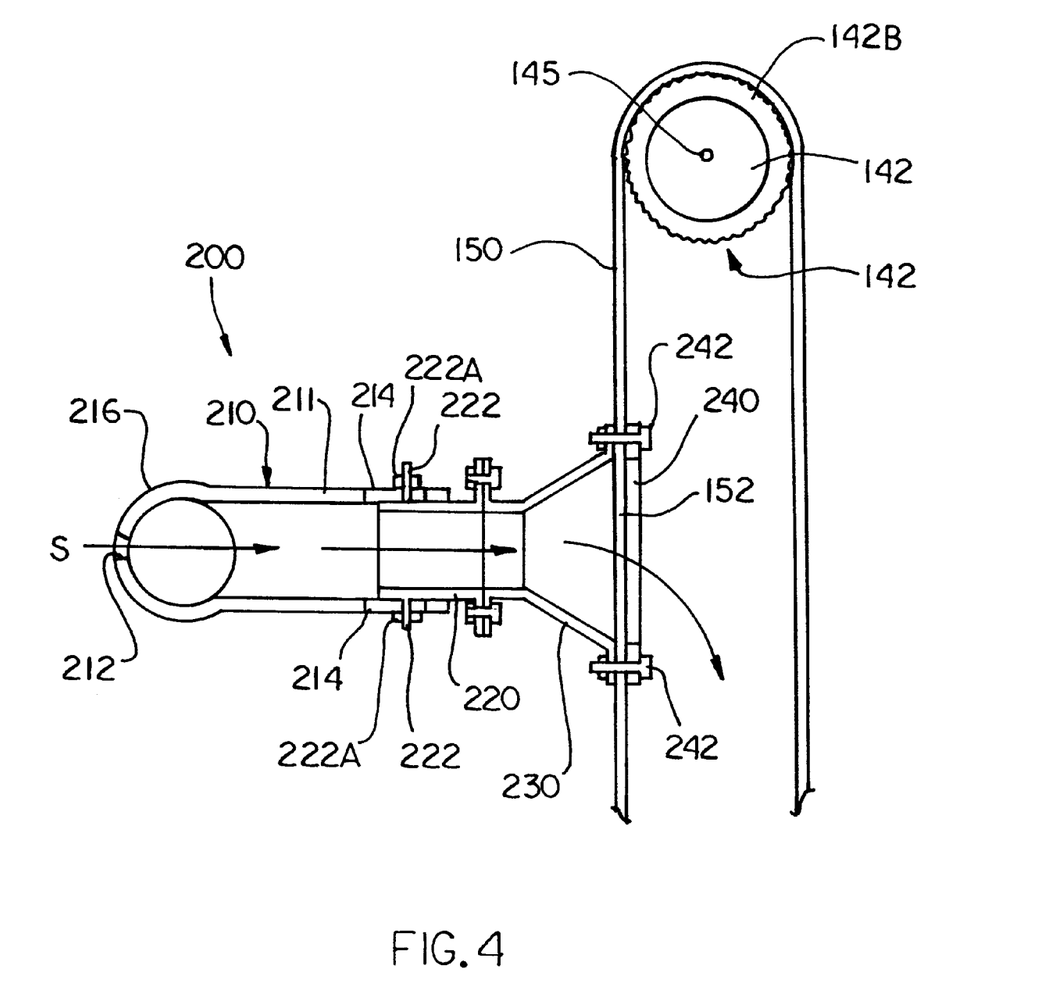
FIG. 4 is a fragmentary, cross sectional, side elevational view of a nozzle, a belt, and a roller forming a part of a filter cleaning unit according to the present invention.
Figure 7:
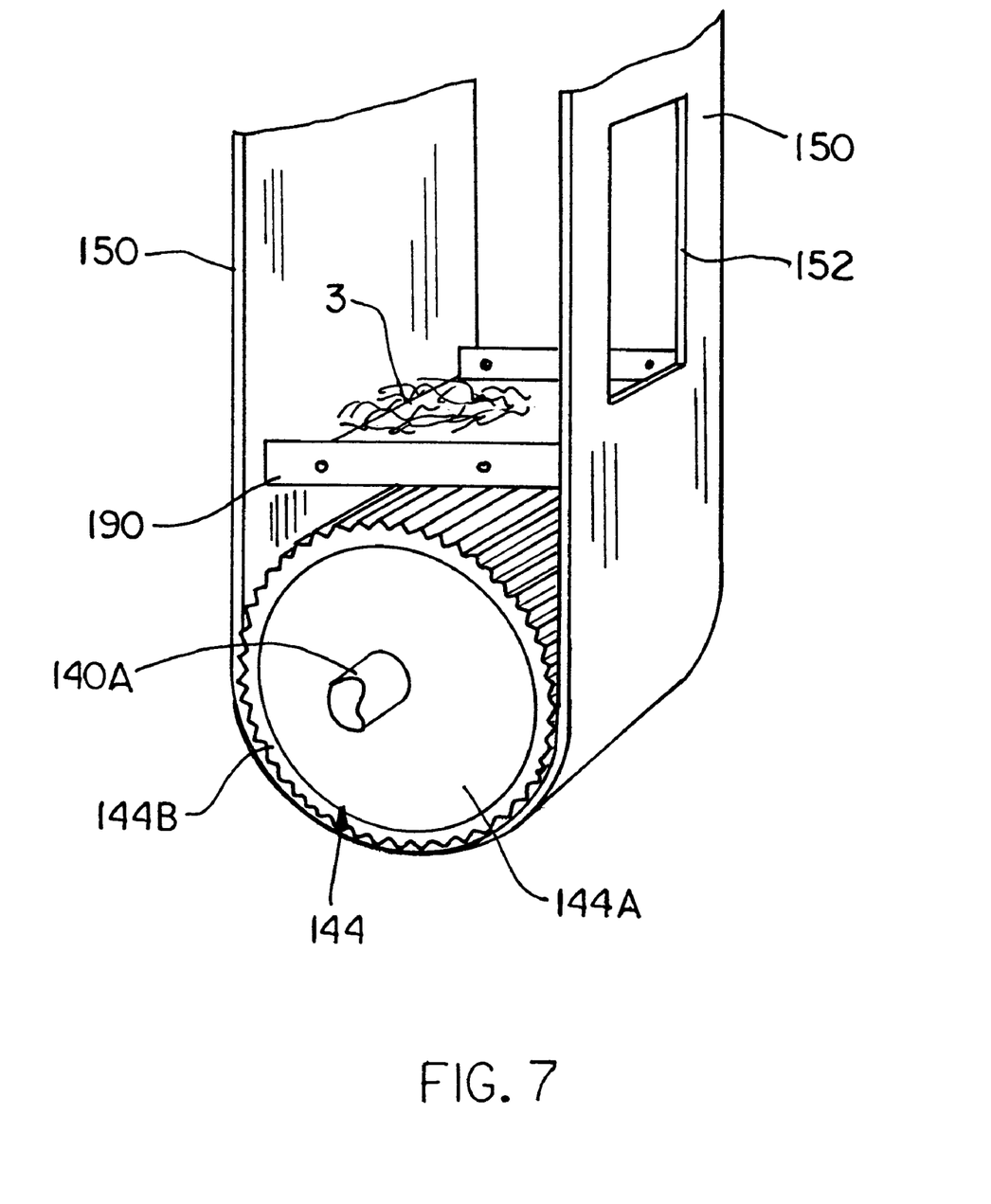
FIG. 7 is a fragmentary, perspective view of the belt, a lower roller, and a dust and debris collecting tray each forming a part of the filter cleaning unit.

With reference to FIG. 2, each cleaning unit 100 has an endless belt 150 which extends between rollers 142 and 144. Preferably, belt 150 is of multi-ply construction and is formed from laminated polyurethane layers with cording sandwiched therein. Belt 150 should have a thickness of about ¼" and sufficient flexibility to bend around rollers 142, 144 without damage. With reference to FIGS. 4 and 7, upper roller 142 rotates about shaft 145 and lower roller 144 is secured to and rotated by common shaft 140A. Rigid body portions 142A and 144A are covered around their peripheries by ribbed rubber sleeves 142B and 144B, respectively. The sleeves ensure good traction between the rollers and the belt. Each lower roller 144 is driven by motor 140, preferably via common shaft 140A. With continued reference to FIGS. 4 and 7, a hole 152 is formed in the portion of belt 150 facing the respective filter 24. Hole 152 is preferably rectangular as shown with a width of from about 2 to 4 inches and a height of from about 8 to 12 inches. As discussed in more detail below, nozzle 200 is mounted over hole 152.

Figure 5:
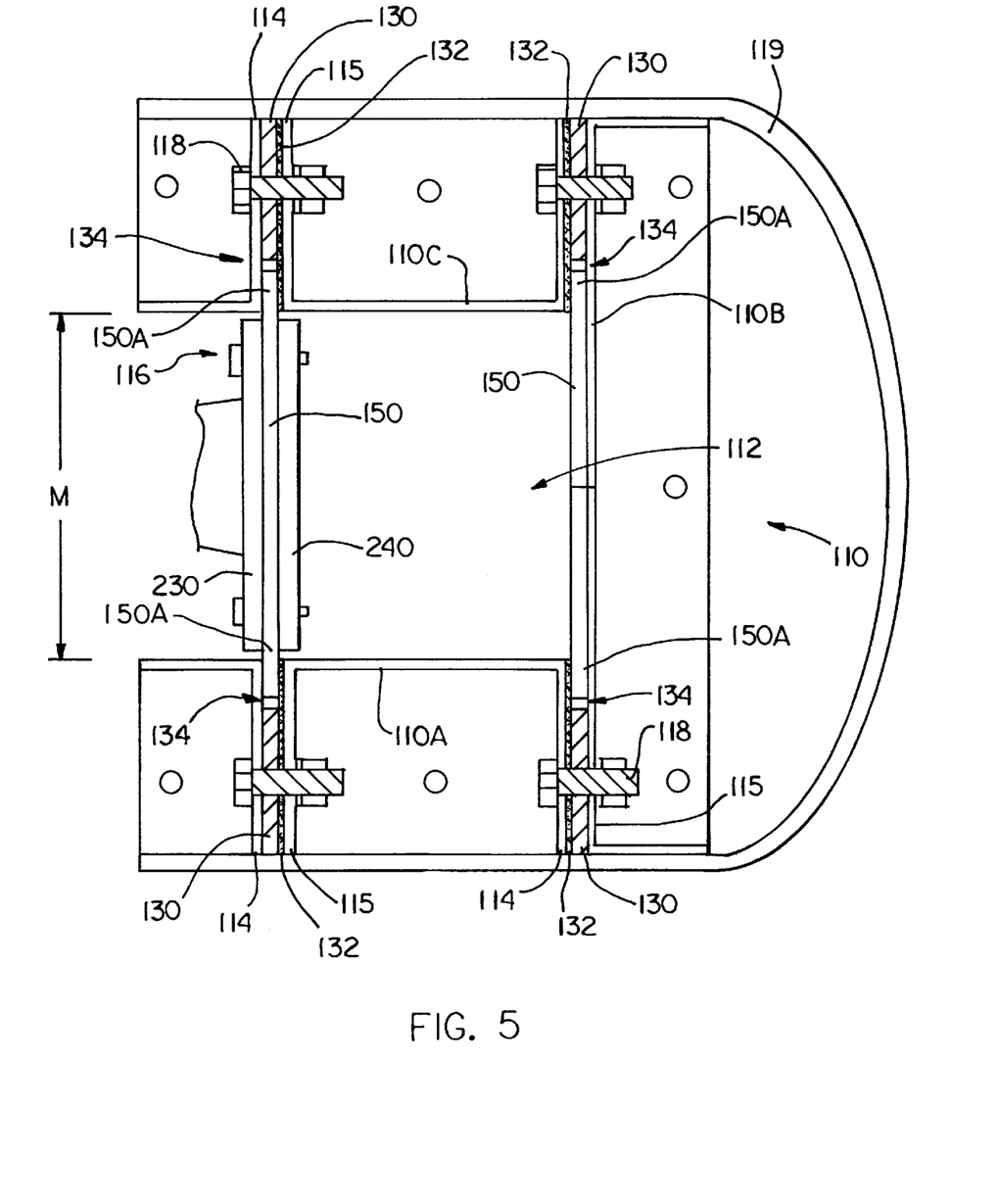
FIG. 5 is a top, cross sectional view of the belt and a duct each forming a part of the filter cleaning unit.
Figure 6:
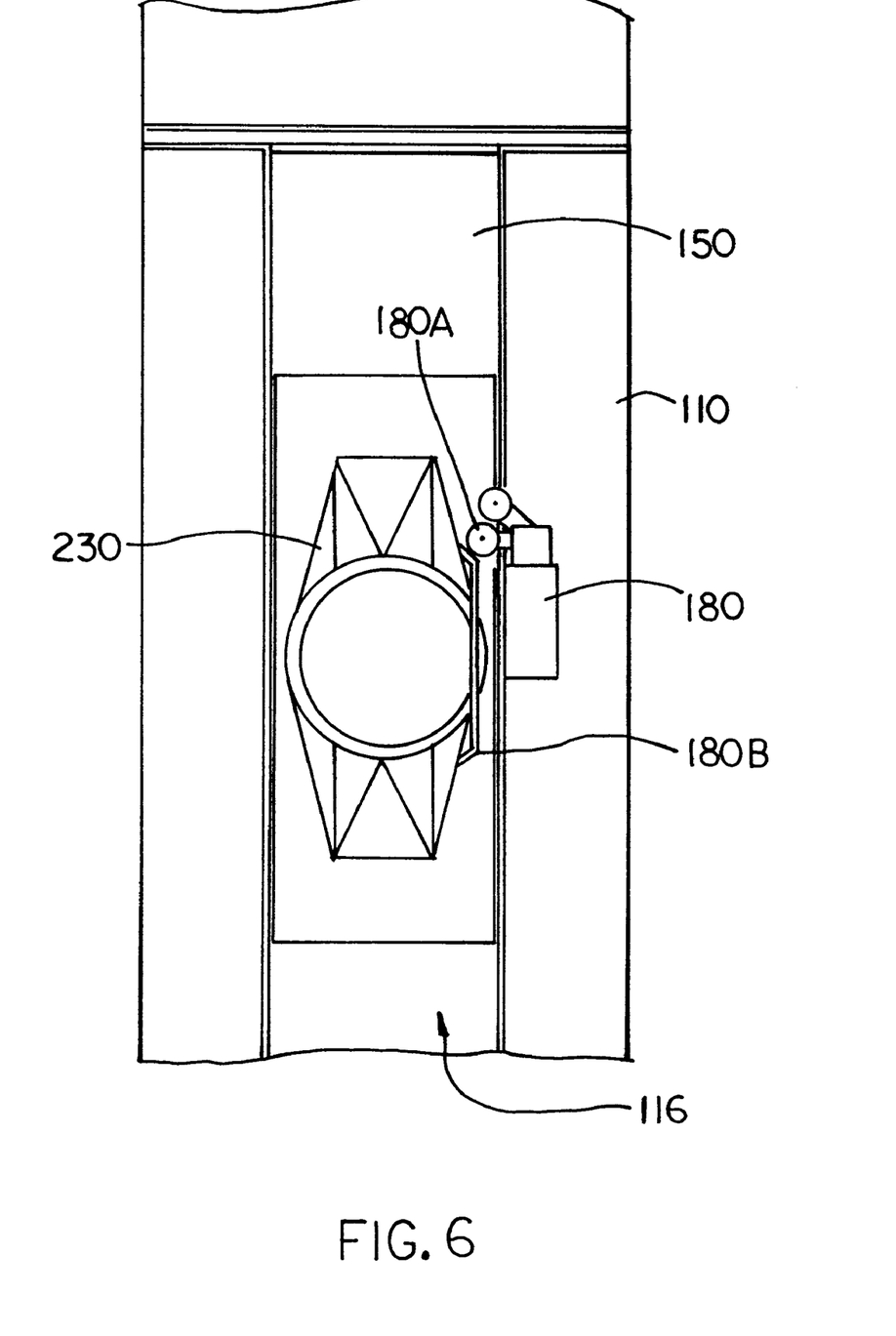
FIG. 6 is a front elevational, fragmentary view of the filter cleaning unit including a limiting switch forming a part of the cleaning unit.

Turning to ducts 110 in more detail, and as best seen in FIGS. 5 and 6, each duct 110 has side walls 1A, 1C and back wall 1B. Walls 114, 115 define flanges 134 therebetween. A slot 116 is defined in the side of duct 110 opposite wall 110B and facing the respective filter 24. Slot 116 preferably has a width M of from about 4 to 6 inches. Belt 150 is disposed in slot 116. More particularly, edge portions 150A of belt 150 are disposed in flanges 134 as shown. Preferably, belt 150 is from about 5 to 7 inches wide and overall edge portions 150A are each from about ½ to ¾ inches wide. Similarly, the portion of belt 150 on the back side of duct 110 (i.e., immediately adjacent wall 110B) has edge portions 150A which are disposed in and ride along flanges 134. While the various beams and walls of duct 110 as shown are secured together by bolts 118, it will be appreciated that the duct may be constructed by other means. The distance between the interior surfaces of walls 110A and 110C is preferably from about 4 to 5 inches. The distance between the inwardly facing surfaces of wall 110B and the inner surface of the portion of the belt in slot 116 is preferably from about 4 to 5 inches.

The three walls 110A, 110B, 110C along with the portion of belt 150 disposed in slot 116 define a substantially enclosed plenum 112. Spacers 130 formed of NEOPRENE™ or other suitable polymeric material allow for adjustment of the widths of flanges 134 while maintaining a substantially airtight seal. Bearing layers 132, preferably formed of DELRIN™ or similar polymeric material, provide low friction surfaces for the belt edge portions 150A to ride along while also providing a substantially airtight seal with belt 150 when a vacuum is applied to plenum 112.

Figure 3:
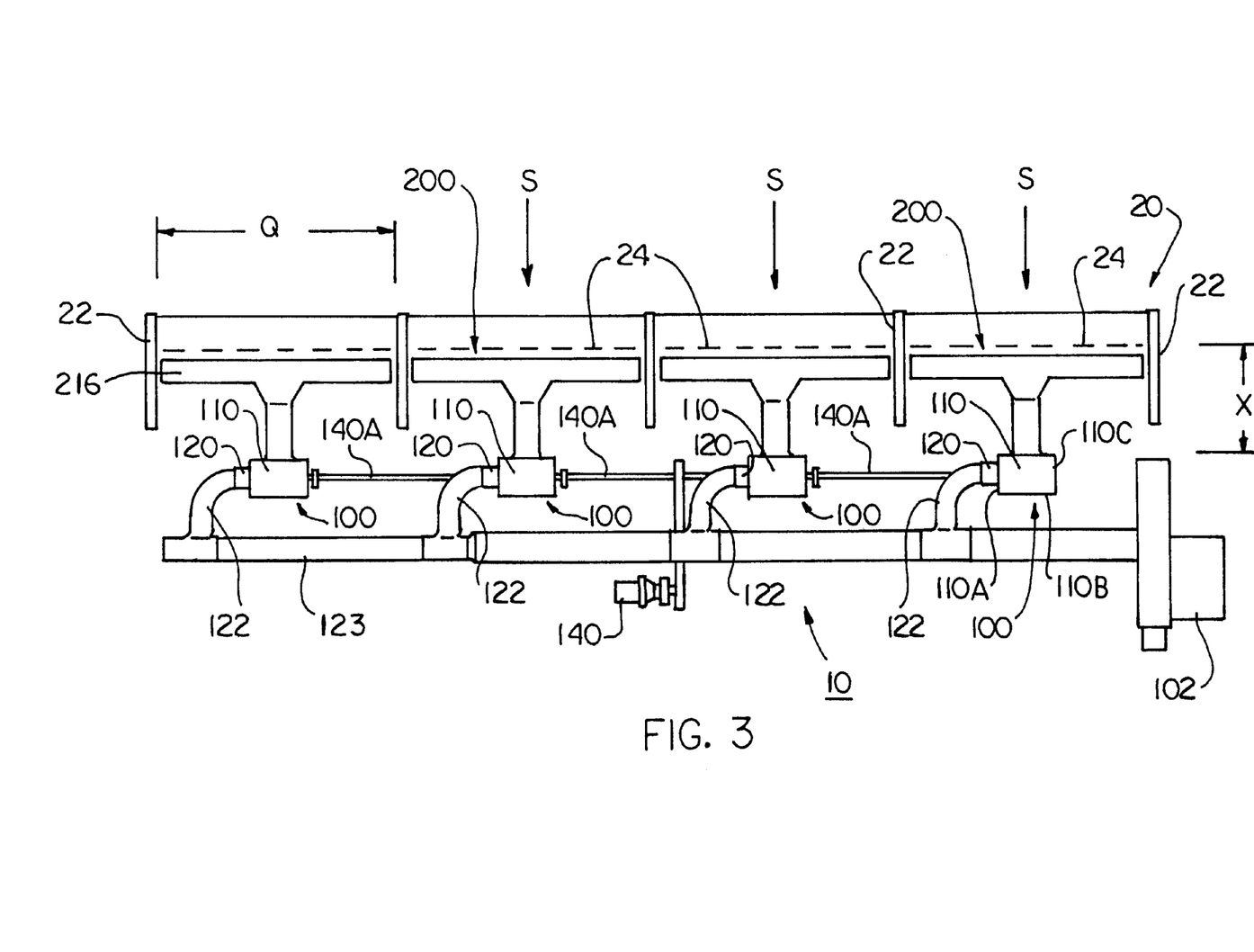
FIG. 3 is a fragmentary, top plan view of the air cleaning system.

Each duct 110 has an exit port 120 which is fluidly connected to a blower 102 by a length of conduit 122 and a common conduit 123. With reference to FIGS. 2, 3, and 4, it will be appreciated that as suction force is provided by blower 102, air will be drawn in direction S and through filter 24, nozzle 200, opening 152, duct 110, exit port 120, conduit 122, and common conduit 123, in that order.

As noted above, the movement of belt 150, and thus nozzle 200, is controlled by motor 140. In operation, it is desired to have nozzle 200 translate upwardly along filter 24 and, after it has reached the top of filter 24, translate back down to the bottom of filter 24, repeating this process for so long as dust and debris removal is needed. To this end, limit switches 180 as shown in FIGS. 2 and 6 are mounted at the upper and lower ends of the nozzle's desired path. The upper limit switch is shown in FIG. 6. Limit switch 180 has lever arm/roller 180A which is actuated upon contact with deflector bracket 180B mounted on a portion of nozzle 200 near the belt 150. When nozzle 200 moves up to its highest desired position, bracket 180 deflects lever arm 180A, actuating switch 180, in turn causing motor 140 to reverse direction. As a result, the direction of belt 150, and thus nozzle 200, is reversed. The nozzle continues to move downwardly until by a similar arrangement the lower limit switch 180 is actuated, causing motor 140 to reverse direction, whereupon nozzle 200 again moves upwardly.

Although a lever type limit switch has been described for initiating the reciprocating nozzle movement, other types of switches may be used. By way of a non-limiting example, a roller-plunger type limit switch may be used. One suitable switch is the Model X CK P h7, available from the Telemecanique Division of the Schneider Electric Group.

In many operations, it will not be desirable for the nozzle to continuously sweep the stationary filter. In particular, it may be desirable for the filter cleaning system 10 to only clean the filter when a certain minimum pressure drop across the filter has been exceeded. To this end, a pressure drop sensor 182 is provided including inlet and outlet air flow meters. Pressure drop sensor 182 is appropriately connected to the drive motor to actuate and deactuate the motor as needed.

With reference to FIG. 4, nozzle 100 is mounted on belt 150 by backing ring plate 240, tubular base portion 230, and bolts 242. Base portion 230 in turn has mounted thereto an intermediate tubular sleeve 220. Threaded shafts 222 are fixedly secured to intermediate sleeve 220 and extend outwardly therefrom. T-shaped, tubular nozzle portion 210 is fitted over intermediate portion 220. Nozzle portion 210 has formed in the neck 211 thereof lengthwise slots 214 through which shafts 222 extend. Nozzle portion 210 is sized such that it may be slid up or down the length of intermediate portion 220. The position of portion 210 relative to portion 220 may be fixed by tightening nuts 222A on shafts 222 to provide an interference fit. Nozzle portion 210 has horizontally shaped nozzle head 216 with narrow inlet slot 212 formed therein and extending across substantially the entire length of nozzle head 216. From the foregoing, it will be appreciated that the distance between inlet 212 and belt 150 may be conveniently selectively adjusted by means of slots 214, threaded shaft 222, and bolts 222A. Also, the multi-piece construction of nozzle 200 allows various elements to be replaced if damaged and also allows for breakdown of the nozzle for transport. Also, if different nozzle parts are needed (e.g., a nozzle portion 210 having a longer or shorter inlet 212), replacement is easily accomplished.

The lengthwise adjustability of nozzle 200 with respect to belt 150 allows the operator to adjust the distance between inlet 212 and the collecting surface of the filter media as needed. Notably, the adjustability of the nozzle is easily effectuated and does not require any movement or realignment of the duct, belt, or filter. Preferably, nozzle 200 is lengthwise adjustable through a range of from a shortest length (as measured from the belt to inlet slot 212) of from about 16¾ to 17 inches to a longest length of from about 17¾ to 18 inches. More preferably, the length of the nozzle may be adjusted from a shortest length of about 16¾ inches to a longest length of about 18 inches.

Inlet slot 212 should have a length Q (see FIG. 3) about 4 inches less than the width of the corresponding filter media 24. Preferably, the length of inlet slot 212 is from about 39 to 40 inches. In any event, the length Q of the inlet slot 212 should be at least twice the width of opening 152 in the belt. More preferably, length Q is from about 8 to 11 times the belt opening width. Inlet slot 212 is preferably from about ½ to ¾ inch high. Neck 211 of nozzle portion 210 and intermediate sleeve 220 preferably each have an inner diameter of from about 3 to 4 inches. Base portion 230 is generally conically shaped as shown to reduce turbulence at the belt opening.

As shown in FIG. 2, filter cleaning system 10 may be advantageously provided with adjustable spacing brackets 184. Brackets 184 extend between and are secured to each of duct 110 and filter bank 20. The lengths of brackets 184 are adjustable by telescoping or other suitable mechanisms. Brackets 184 may be selectively adjusted to ensure that a prescribed distance X between belt 150 and filter media 24 is maintained. Further, brackets 184 help to stabilize the duct. Distance X is preferably from about 1/16 to ¼ inch greater than the distance from the belt to inlet 212, and more preferably is in the range of from about 16 to 19 inches.

With reference to FIGS. 2 and 7, air cleaning unit 100 is provided with means to easily collect and dispose of dust or debris which enters duct 110 and settles within duct 110 rather than exiting thorough exit port 120 to the blower. Tray 190 is positioned over lower roller 144. Tray 190 extends from duct wall 110A to duct wall 110C and may be bolted to each duct wall. Clearance of about 1/32 inch is provided between the opposed inner surfaces of belt 150 and tray 190. As dust and debris 3 fall down duct 110, they are collected on tray 190, thereby serving to keep roller sleeve 144B clean. As shown in FIG. 2, a door 192 is provided in side wall 110A immediately adjacent or just above tray 190 for accessing the tray and removing the accumulated dust and debris therefrom.

As shown in FIG. 5, a cover 119 may be provided about duct 110 to protect the bolted together components and provide better air flow across the ducts.

Figure 8:
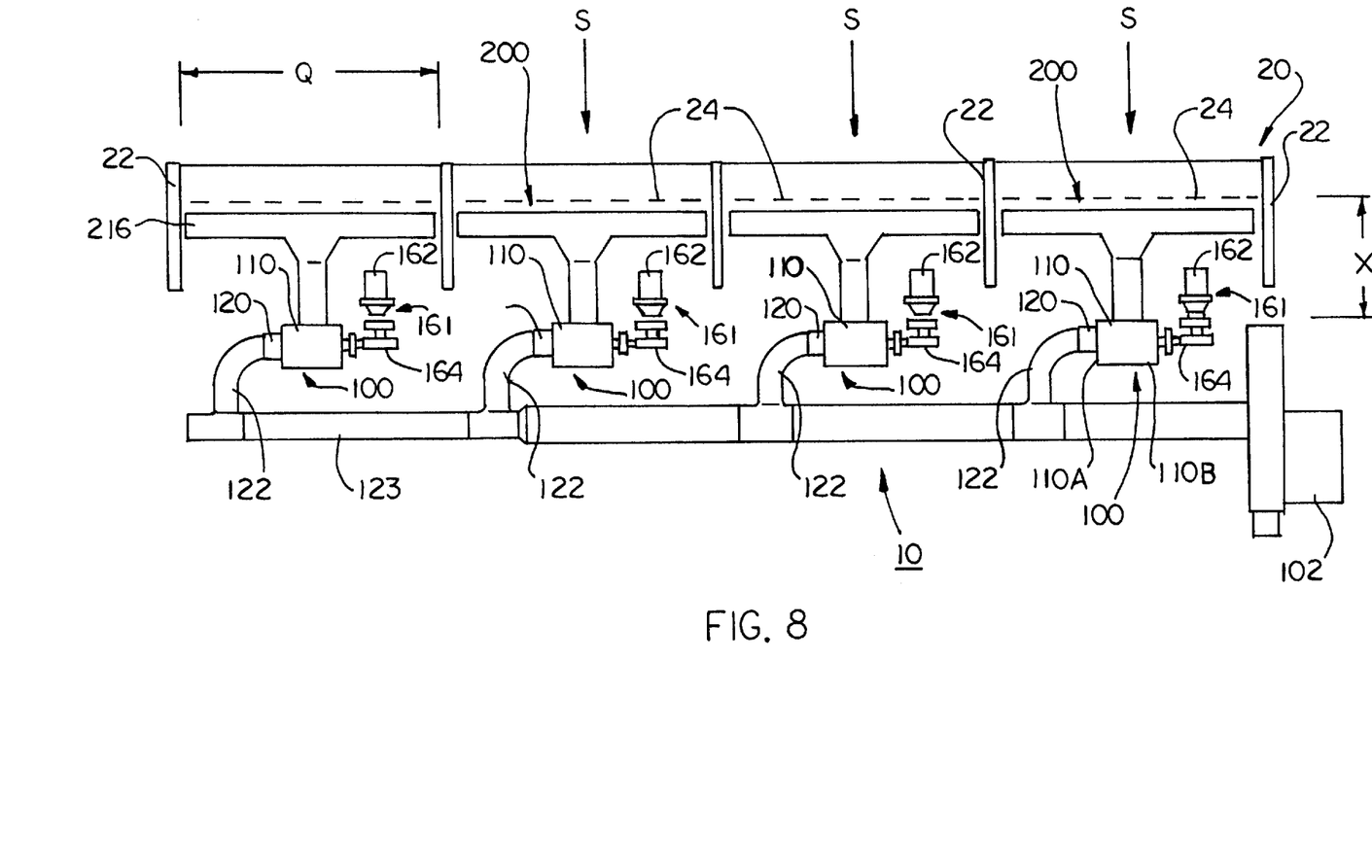
FIG. 8 is a fragmentary, top plan view of an alternative embodiment of the air cleaning system.

As best illustrated in FIGS. 1 and 3, the embodiment described above uses a single motor 140 coupled to an extended common shaft 140A to drive a plurality of lower rollers 144. Turning now to FIG. 8, an alternative embodiment includes a separate belt driver 161 for each cleaning unit 100. Each of the belt drivers 161 includes a drive motor 162 coupled to lower roller 144 via separate drive shafts 164 and operates independently of the other motors. The operation of each of the drive motors 162 may be initiated as described above, that is, on a continuous basis or in response to a detected pressure differential across the filter. It will be readily appreciated that in this embodiment a separate pressure sensor 182 may be included for each cleaning unit 100 so as to provide for independent control of driver motor operation. One of the advantages of this embodiment is that the cleaning of each filter may be controlled individually on an as-needed basis. Thus, if one of a plurality of filters tends to collect more debris than the others, it may be cleaned with greater frequency responsive to the control of the pressure sensor 182 for that filter. Another advantage of this embodiment is that should one of the individual drive motors 162 fail, then the remaining units would be able to continue to operate to clean their respective filters. The single drive motor embodiment will be rendered completely inoperative in such a circumstance. Yet another advantage stems from the increased torque available from the individual drive motor arrangement. It has been found that the embodiment depicted in FIG. 1 may experience some slippage between the belt 150 and the lower roller 144 in the cleaning units 100 that are not located directly adjacent the motor 140. The provision of individual drive motors 162 has addressed this problem. Numerous other advantages to the provision of separate belt drivers will be readily apparent to one of ordinary skill. The scope of the present invention includes those advantages.

The air cleaning apparatus as described above provides numerous benefits as will be appreciated by those of ordinary skill in the art. A primary advantage is that the T-shaped nozzle having an inlet wider than the belt opening provides a cleaning path covering the full width of the filter without requiring that the duct be as wide as the filter or that the duct be moved relative to the filter. The cleaning units allow the use of stationary, flat pre-filters, thereby eliminating the need for disposable, roll type filters. The adjustability of the nozzles and the positioning of the ducts allows the apparatus to be easily adapted for different flat, stationary filter configurations. The nozzles may be conveniently replaced with nozzles of different widths to accommodate filters of different widths. In general, the system is relatively easy to install, adapt, and operate. Further, the system is durable and efficient.

While a preferred embodiment of the present invention has been described, it will be appreciated by those of skill in the art that certain modifications may be made without departing from the scope of the present invention. For example, the diameter of the nozzle, the width and length of the slot, the distance between the filter media and the duct, and the size of the belt could be modified to accommodate different applications. Available space, air flow requirements, and material loads may affect the specific configuration employed. The length of the nozzle could be non-adjustable. All such modifications are intended to come within the scope of the claims which follow.

What is claimed is:

1. An air cleaning apparatus for removing dust and debris from a volume of air, said apparatus comprising:
   a) a stationary filter having a dust and debris collecting surface;
   b) a cleaning unit comprising:
      i) a longitudinally extending duct spaced from said collecting surface a predetermined distance and extending lengthwise along said collecting surface, a lengthwise slot formed in said duct and facing said collecting surface said slot further including a pair of opposed flanges formed along said slot said flanges forming opposing belt receiving cavities within the slot;
      ii) a belt in said duct and extending across said slot, said belt extending between said flanges and having a pair of spaced apart edge portions each disposed within a respective one of said pair of opposed flanges, said duct and said belt defining a plenum, said belt having an opening formed therein adjacent said slot and in fluid communication with said plenum, said belt mounted for movement within said slot such that said opening may be repositioned along the length of said slot; and
      iii) a nozzle mounted on said belt for movement therewith and extending outwardly from said belt toward said collecting surface, said nozzle having an inlet adjacent said collecting surface and distal from said belt, said inlet having a width substantially transverse to the length of said slot which is greater than a corresponding width of said opening in said belt, said inlet in fluid communication with said opening and thereby said plenum;
   c) a belt driver operatively coupled to said belt; and
   d) a suction source operable to create a vacuum in said plenum and thereby at said inlet of said nozzle, for drawing dust and debris disposed on said collecting surface through said inlet, said nozzle, and said opening, and into said plenum.

2. The apparatus of claim 1 further including a plurality of said cleaning units in side-by-side and substantially parallel relation to one another.

3. The apparatus of claim 2 wherein each cleaning unit further includes at least one roller and said belt is mounted on said roller for movement within said slot, wherein each of the rollers are coupled to separate belt drivers.

4. The apparatus of claim 1 wherein said belt driver is operable to move said belt within said slot in first and second opposed directions so that said nozzle may be reciprocated in said first and second directions.

5. The apparatus of claim 4 further including a limit switch disposed adjacent said slot and operative to reverse the direction of said belt driver when actuated, said switch arranged and configured such that it is actuated when said nozzle is disposed in a predetermined end position with respect to said slot.

6. The apparatus of claim 5 wherein said limit switch is a lever arm switch.

7. The apparatus of claim 5 wherein said limit switch is a roller plunger switch.

8. A filter cleaning apparatus for removing dust and debris from a stationary filter having a dust and debris collecting surface, said apparatus comprising a cleaning unit including:
   a) a longitudinally extending duct having a lengthwise slot formed therein said slot further including a pair of opposed flanges formed along said slot said flanges forming opposing belt receiving cavities within the slot;
   b) a belt in said duct and extending across said slot, said belt extending between said flanges and having a pair of spaced apart edge portions each disposed within a respective one of said pair of opposed flanges, said duct and said belt defining a plenum, said belt having an opening formed therein adjacent said slot and in fluid communication with said plenum, said belt mounted for movement within said slot such that said opening may be repositioned along the length of said slot;
   c) a nozzle mounted on said belt for movement therewith and extending outwardly from said belt, said nozzle having an inlet distal from said belt, said inlet having a width substantially transverse to the length of said slot which is greater than a corresponding width of said opening in said belt, said inlet in fluid communication with said opening and thereby said plenum; and d) a belt driver operatively coupled to said belt.

9. The apparatus of claim 8 further including a plurality of said cleaning units in side-by-side and substantially parallel relation to one another.

10. The apparatus of claim 9 wherein each cleaning unit further includes at least one roller and said belt is mounted on said roller for movement within said slot, wherein each of the rollers are coupled to separate belt drivers.

11. The apparatus of claim 9 wherein said belt driver is operable to move said belt within said slot in first and second opposed directions so that said nozzle is reciprocated in said first and second directions.

12. The apparatus of claim 11 further including a limit switch disposed adjacent said slot and operative to reverse the direction of said belt driver when actuated, said switch arranged and configured such that said switch is actuated when said nozzle is disposed in a predetermined end position with respect to said slot.

13. The apparatus of claim 12 wherein said limit switch is a lever arm switch.

14. The apparatus of claim 12 wherein said limit switch is a roller plunger switch.

* * * * *